United States Patent
Tertinek et al.

(10) Patent No.: US 12,047,113 B2
(45) Date of Patent: Jul. 23, 2024

(54) COMMUNICATION DEVICE AND OPERATING METHOD

(71) Applicant: NXP B.V., Eindhoven (NL)

(72) Inventors: Stefan Tertinek, Graz (AT); Manuel Lafer, Ottendorf (AT); Wolfgang Küchler, Graz (AT)

(73) Assignee: NXP B.V., Eindhoven (NL)

( * ) Notice: Subject to any disclaimer, the term of this patent is extended or adjusted under 35 U.S.C. 154(b) by 20 days.

(21) Appl. No.: 18/154,976

(22) Filed: Jan. 16, 2023

(65) Prior Publication Data

US 2023/0254007 A1    Aug. 10, 2023

(30) Foreign Application Priority Data

Feb. 4, 2022   (EP) .................................... 22155222

(51) Int. Cl.
*H04B 1/71* (2011.01)
*H04B 1/7163* (2011.01)
*H04B 7/08* (2006.01)
*H04L 25/02* (2006.01)

(52) U.S. Cl.
CPC ....... *H04B 1/71637* (2013.01); *H04B 7/0805* (2013.01); *H04L 25/0212* (2013.01)

(58) Field of Classification Search
CPC .............. H04B 1/71637; H04B 7/0805; H04L 25/0212
See application file for complete search history.

(56) References Cited

U.S. PATENT DOCUMENTS

| | | |
|---|---|---|
| 10,056,993 B2 | 8/2018 | Clancy et al. |
| 10,992,419 B1 | 4/2021 | Zhou et al. |
| 2012/0069868 A1* | 3/2012 | McLaughlin ....... H04L 25/0212 375/E1.004 |
| 2018/0138941 A1* | 5/2018 | McLaughlin ...... H04B 1/71637 |
| 2019/0074930 A1 | 3/2019 | Kuchler et al. |
| 2019/0170847 A1 | 6/2019 | Jamin et al. |
| 2020/0383052 A1 | 12/2020 | Zhou et al. |
| 2021/0076350 A1* | 3/2021 | Yang ......................... G01S 3/50 |
| 2021/0356550 A1* | 11/2021 | Lee ........................... G01S 5/12 |

(Continued)

OTHER PUBLICATIONS

IEEE Std 802.15.4™-2020 (Revision of IEEE Std 802.15.4-2015), "IEEE Standard for Low-Rate Wireless Networks", IEEE Computer Society, LAN/MAN Standards Committee, Jul. 23, 2020.

(Continued)

*Primary Examiner* — Freshteh N Aghdam

(57) ABSTRACT

In accordance with a first aspect of the present disclosure, a communication device is provided, comprising: at least two antennas; an ultra-wideband (UWB) communication unit configured to receive UWB frames through said antennas; a controller configured to switch between said antennas such that consecutive UWB frames are received through different ones of said antennas; wherein the controller is further configured to compute channel impulse responses (CIRs) wherein each of said CIRs is based on a different one of said UWB frames. In accordance with a second aspect of the present disclosure, a corresponding method of operating a communication device is conceived. In accordance with a third aspect of the present disclosure, a computer program is provided for carrying out said method.

19 Claims, 8 Drawing Sheets

(56) References Cited

U.S. PATENT DOCUMENTS

2022/0166649 A1    5/2022   Lafer et al.
2023/0003866 A1*   1/2023   Kang .................. H04B 1/7163

OTHER PUBLICATIONS

Leong, F., "IEEE P802.15 Working Group for Wireless Personal Area Networks (WPANs)", UWB Sensing in 802.15, Jul. 2021.
Leong, F., "IEEE P802.15 Working Group for Wireless Personal Area Networks (WPANs)", Sensing—continued, Jan. 2022.
Peng, X., "IEEE P802.15 Working Group for Wireless Personal Area Networks (WPANs)", UWB sensing methods and KPIs in 802.15, Sep. 2021.
U.S. Appl. No. 17/817,372, filed Aug. 4, 2022, entitled "Communication Device and Corresponding Operating Method".

* cited by examiner

COMMUNICATION DEVICE AND OPERATING METHOD

CROSS-REFERENCE TO RELATED APPLICATIONS

This application claims the priority under 35 U.S.C. § 119 of European Patent application no. 22155222.7, filed on 4 Feb. 2022, the contents of which are incorporated by reference herein.

TECHNICAL FIELD

The present disclosure relates to a communication device. Furthermore, the present disclosure relates to a corresponding method of operating a communication device, and to a computer program for carrying out said method.

BACKGROUND

Ultra-wideband (UWB) communication technology is a technology that uses a high signal bandwidth, in particular for transmitting digital data over a wide spectrum of frequency bands with very low power. For example, UWB technology may use the frequency spectrum of 3.1 to 10.6 GHz and may feature a high-frequency bandwidth of more than 500 MHz and very short pulse signals, potentially capable of supporting high data rates. The UWB technology enables a high data throughput for communication devices and a high precision for the localization of devices. In particular, UWB technology may be used for so-called ranging operations, i.e., for determining the distance between communicating devices. Therefore, UWB technology may be used to advantage in various applications, such as automotive applications.

SUMMARY

In accordance with a first aspect of the present disclosure, a communication device is provided, comprising: at least two antennas; an ultra-wideband (UWB) communication unit configured to receive UWB frames through said antennas; a controller configured to switch between said antennas such that consecutive UWB frames are received through different ones of said antennas; wherein the controller is further configured to compute channel impulse responses (CIRs) wherein each of said CIRs is based on a different one of said UWB frames.

In one or more embodiments, the controller is further configured to compute the CIRs based on a SYNC field comprised in said UWB frames.

In one or more embodiments, the controller is further configured to compute phase values, wherein each of said phase values is associated with a different one of the CIRs.

In one or more embodiments, the controller is further configured to compute an angle of arrival based on at least one of the phase values.

In one or more embodiments, the controller is further configured to determine and store an optimal receiver phase value for a first UWB frame, and to set an optimal receiver phase value for a second UWB frame based, at least in part, on the stored optimal receiver phase value for the first UWB frame.

In one or more embodiments, the communication device further comprises a local oscillator, wherein the controller is configured to turn said local oscillator on and off between successively received UWB frames.

In one or more embodiments, the controller is further configured to determine a carrier frequency offset (CFO) in particular by receiving a separate UWB frame through the UWB communication unit, and to compensate said CFO.

In one or more embodiments, the communication device is configured to operate in a ranging mode.

In one or more embodiments, a communication system comprises the communication device configured to operate in the ranging mode, wherein the communication device is configured to operate as a responder node in the communication system.

In one or more embodiments, the communication system further comprises an initiator node, wherein the initiator node comprises at least two antennas, a UWB communication unit configured to transmit UWB frames through said antennas, and a controller configured to switch between said antennas such that consecutive UWB frames are transmitted through different ones of said antennas.

In one or more embodiments, the communication device is configured to operate in a radar mode.

In one or more embodiments, the radar system comprises the communication device configured to operate in the radar mode, wherein the communication device is configured to operate as receiving node in the radar system and is collocated with a transmitting node in the radar system.

In one or more embodiments, the transmitting node comprises at least two antennas, a UWB communication unit configured to transmit UWB frames through said antennas, and a controller configured to switch between said antennas such that consecutive UWB frames are transmitted through different ones of said antennas.

In accordance with a second aspect of the present disclosure, a method of operating a communication device is conceived, the communication device comprising at least two antennas, an ultra-wideband (UWB) communication unit and a controller, the method comprising: the UWB communication unit receives UWB frames through said antennas; the controller switches between said antennas such that consecutive UWB frames are received through different ones of said antennas; the controller computes channel impulse responses (CIRs), wherein each of said CIRs is based on a different one of said UWB frames.

In accordance with a third aspect of the present disclosure, a computer program is provided, comprising computer-executable instructions which, when executed by a communication device, cause said communication device to carry out a method of the kind set forth.

DESCRIPTION OF DRAWINGS

Embodiments will be described in more detail with reference to the appended drawings.

DESCRIPTION OF EMBODIMENTS

Figure 1:
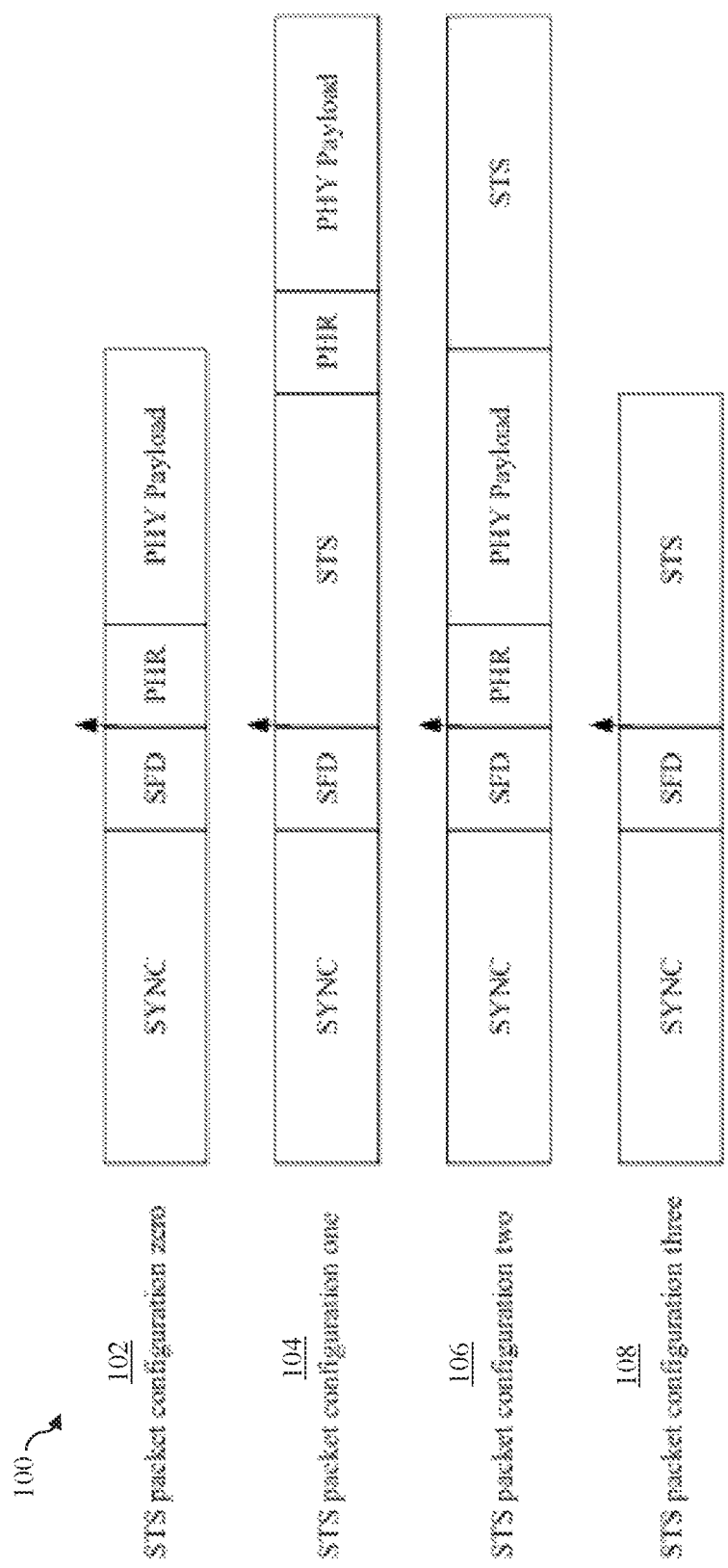
FIG. 1 shows an example of scrambled timestamp sequence (STS) packet configurations.

As mentioned above, ultra-wideband (UWB) communication technology is a technology that uses a high signal bandwidth, in particular for transmitting digital data over a wide spectrum of frequency bands with very low power. For example, UWB technology may use the frequency spectrum of 3.1 to 10.6 GHz and may feature a high-frequency bandwidth of more than 500 MHz and very short pulse signals, potentially capable of supporting high data rates. The UWB technology enables a high data throughput for communication devices and a high precision for the localization of devices. In particular, UWB technology may be used for so-called ranging operations, i.e., for determining the distance between communicating devices. Therefore, UWB technology may be used to advantage in various applications, such as automotive applications.

In particular, UWB technology—also referred to as impulse-radio ultra-wideband (IR-UWB)—is an RF communication technology that uses pulses having a short duration for data communication. An important feature of IR-UWB technology is that it can be used for secure and accurate distance measurements between two or more devices. Typical distance measurement methods are the so-called single-sided two-way ranging (SS-TWR) method and the double-sided two-way ranging (DS-TWR) method.

Because UWB technology has an accurate distance measurement capability, it may be used to advantage in access systems in which the position of devices should be determined to enable access to an object. For instance, a vehicle access system may comprise a user's smart device (e.g., key fob) and another smart device (e.g., an anchor embedded in the vehicle). To enable access to the vehicle, the user's smart device must have a predefined range relative to the other smart device. Therefore, UWB transceivers are typically configured to operate in a ranging mode. In another example, UWB technology may be used for accessing a building or a predefined space within a building.

In the ranging mode of operation, so-called UWB frames (i.e., UWB signals) will typically be exchanged between two devices via at least one antenna on each device, and at least a SS-TWR operation will be carried out (which may also be referred to as a ping-pong operation). In particular, channel impulse responses (CIRs) are estimated on both devices, timestamps will be generated based on the CIRs on both devices, and those timestamps are exchanged. Then, a time of flight (ToF) is calculated based on the timestamps and a range (i.e., a distance) is calculated based on the ToF. Alternatively, a DS-TWR operation may be carried out (which may also be referred to as a ping-pong-ping operation). The angle-of-arrival (AoA) mode of operation is similar to the ranging mode, but it involves at least two antennas on one device. In particular, in the AoA mode of operation, two phase values associated with at least two CIRs are calculated on one device. Then, a phase difference of arrival (PDoA) is calculated based on the two-phase values, and an AoA is calculated based on the PDoA. The AoA mode of operation may facilitate a more accurate determination of the position of an object and may thus complement ranging operations performed in the ranging mode. As used in this description, the ranging mode of operation may therefore be extended to include the AoA mode of operation, in the sense that when a device operates in the ranging mode, it may optionally perform additional operations which are typically performed in the AoA mode of operation.

In the radar mode of operation, frames are transmitted by at least one device and those frames are received by the same device and/or by one or more other devices. Then, the CIRs are estimated on the device or devices receiving the frames, and the range and/or velocity and/or AoA are calculated based on the estimated CIRs. The radar mode of operation may be used to advantage to detect (i.e., sense) the presence of objects or human beings. However, the radar mode of operation may also be used to estimate a distance, although with a lower accuracy than the ranging mode of operation will typically achieve. The skilled person will appreciate that the given examples are non-limiting examples of how the different modes of operation can be implemented. In other words, the modes may be implemented differently, depending on the requirements imposed by the application, for example.

Accordingly, a benefit of using an IR-UWB system is that a channel impulse response, as determined by a responder using a received UWB frame, can be used to determine not only the distance (i.e., the range) to an initiator but also the angle of arrival of the incoming radio-frequency (RF) wave from the initiator, which allows the system to use both range and angle for precise localization. While the responder should have two receiving antennas for determining the (2D) AoA, those antennas may be connected to (i) two independent receivers or (ii) one receiver via a RF switch. The second configuration enables a so-called sequential AoA operation, which may result in a lower current consumption.

FIG. 1 shows an example of scrambled timestamp sequence (STS) packet configurations. The technical standard 802.15.4z-2020 (*IEEE Standard for Low-Rate Wireless Networks, Amendment 1: Enhanced Ultra Wideband (UWB) Physical Layers (PHYs) and Associated Ranging Techniques*) defines the format of UWB frames. In particular, said standard defines the following UWB frame formats, called "STS packet configurations (SP)", which can be used for ranging and AoA: (1) SP0 or "STS packet configuration zero" 102, i.e. a configuration according to which a UWB frame only includes a so-called SYNC field, and (2) SP1 or "STS packet configuration one" 104, SP2 or "STS packet configuration two" 106, SP3 or "STS packet configuration three" 108, i.e., configurations according to which a UWB frame includes a SYNC field as well as an STS. The SYNC field is the part of the frame that is used for synchronization purposes, while the STS is the part used for the secure range determination. Thus, frames which are configured in the SP1, SP2 and SP3 formats contain both a SYNC field and an STS, and if a sequential AoA operation is performed a UWB receiver may switch between different antennas during reception of the frame and compute the AoA from the CIRs obtained from the SYNC field and the STS. Alternatively, the AoA may be computed from CIRs obtained from two STS segments, according to further configurations of the frame (not shown). However, frames configured in the SP0 format only contain a SYNC part. In that case, it is not possible to switch between different antennas during the reception of a frame. Thus, frames configured in the SP0 format do not support sequential AoA operations.

Figure 2:
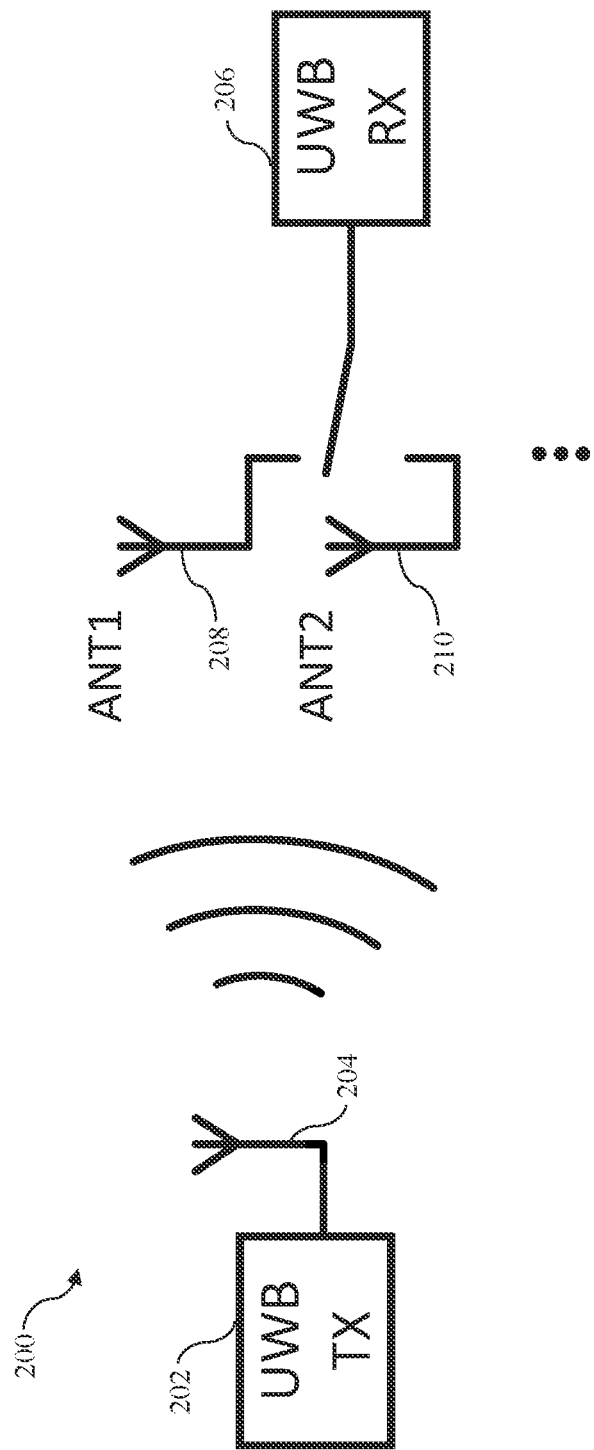
FIG. 2 shows an example of a communication system.

FIG. 2 shows an example of a communication system 200. The communication system 200 comprises a UWB transmitter 202, which may be implemented in an initiator node (referred to in short as "initiator") in the communication system 200. The initiator further comprises an antenna 204 which is operatively coupled to the UWB transmitter 202. In addition, the communication system 200 comprises a UWB receiver 206, which may be implemented in a responder node (referred to in short as "responder") in the communication system 200. The responder further comprises a first antenna 208 and a second antenna 210, which are operatively coupled to the UWB receiver 206 through a switch. The initiator and the responder are capable of transmitting and receiving UWB frames through the UWB transmitter 202 and UWB receiver 206, respectively. As explained with reference to FIG. 1, the communication system 200 supports sequential AoA operations. In particular, when the UWB transmitter 202 on the initiator-side transmits UWB frames, in particular frames which are configured in the SP1, SP2 or SP3 format, the UWB receiver 206 on the responder-side receives the frames and switches between the two antennas 208, 210 during reception of the frames, thereby generating two CIRs in order to determine the PDoA and AoA. However, as mentioned above, frames configured in the SP0 format do not support sequential AoA operations.

Now discussed are a communication device and a corresponding method of operating a communication device, which facilitate enabling sequential AoA operations in a broader range of applications and implementations. In particular, the presently disclosed communication device and corresponding operating method facilitate enabling AoA operations in, inter alia, applications and implementations in which UWB frames configured in the SP0 format are used.

Figure 3:
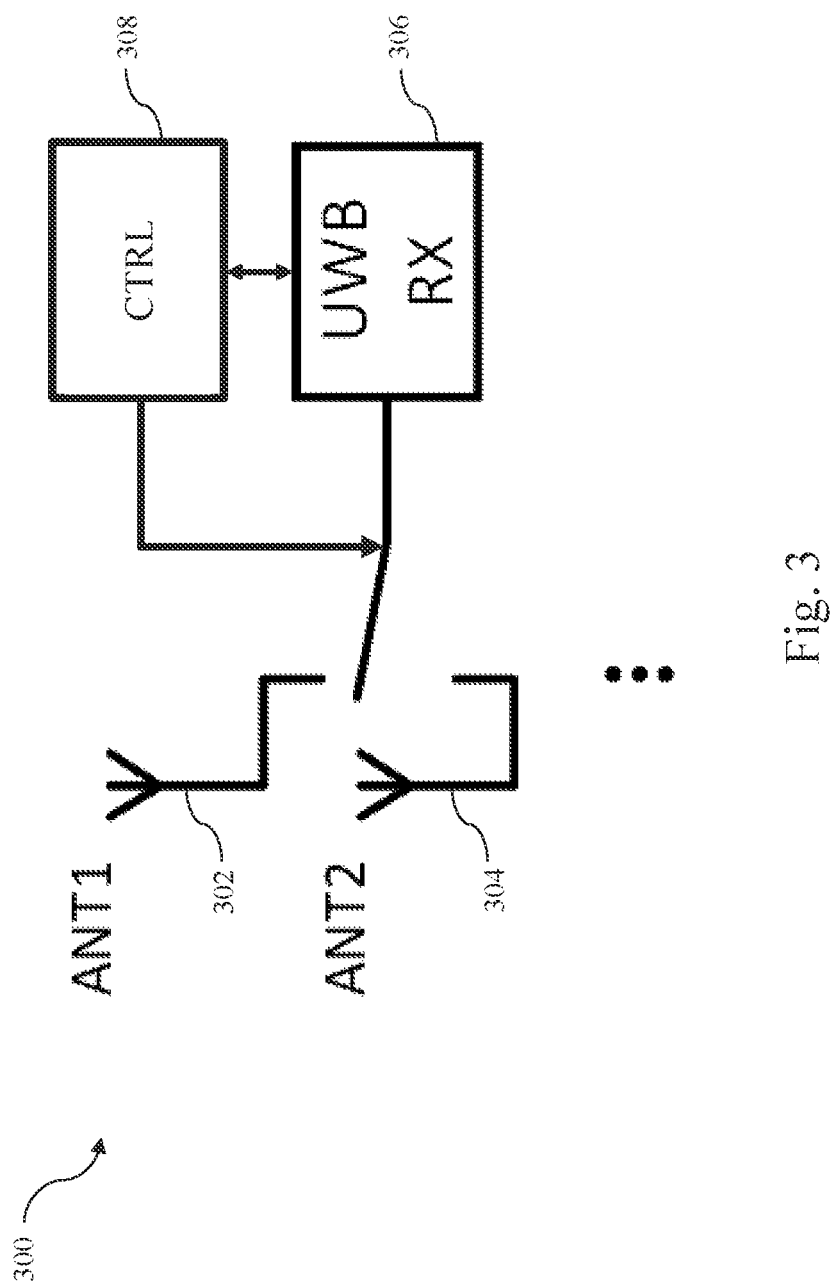
FIG. 3 shows an illustrative embodiment of a communication device.

FIG. 3 shows an illustrative embodiment of a communication device 300. The communication device 300 comprises a first antenna 302 and a second antenna 304, which are operatively coupled to a UWB receiver 306 through a controllable switch. Furthermore, the communication device 300 comprises a controller 308 which is operatively coupled to the UWB receiver 306. The UWB receiver 306 is a communication unit which is configured to receive UWB frames through the antennas 302, 304, for example from an external communication device implemented as an initiator (not shown). Furthermore, the controller 308 is configured to switch between said antennas 302, 304 such that consecutive UWB frames are received through different ones of said antennas 302, 304. In other words, a first frame will be received through the first antenna 302, a second frame following the first frame will be received through the second antenna, a third frame following the second frame will again be received through the first antenna 302, etc. In a practical implementation, the controller 308 may switch between said antennas 302, 304 by controlling the controllable switch between the antennas 302, 304 and the UWB receiver 306. Furthermore, the controller 308 is configured to compute channel impulse responses, wherein each of said channel impulse responses is based on a different one of said UWB frames. By switching between the antennas 302, 304 between consecutive UWB frames, sequential AoA operations may be enabled in a broader range of applications and implementations. In particular, sequential AoA operations are also enabled when UWB frames contain a SYNC field, but no STS. As used herein, the term "UWB frame" may be regarded as synonymous with the term "UWB signal".

In one or more embodiments, the controller is further configured to compute the CIRs based on a SYNC field comprised in said UWB frames. In this way, a practical implementation is realized, which facilitates computing the angle of arrival. In one or more embodiments, the controller is further configured to compute phase values, wherein each of said phase values is associated with a different one of the CIRs. Thereby, the computation of the angle of arrival is further facilitated. More specifically, in a practical implementation, the controller is further configured to compute an angle of arrival based on at least one of the phase values.

In one or more embodiments, the controller is further configured to determine and store an optimal receiver phase value for a first UWB frame, and to set an optimal receiver phase value for a second UWB frame based, at least in part, on the stored optimal receiver phase value for the first UWB frame. For example, the controller may contain a phase tracking loop for performing these functions. In this way, it may be ensured that the phase difference between consecutive frames is only due to the PDoA and not to receiver imperfections, so that the AoA may be determined more accurately. In one or more embodiments, the communication device further comprises a local oscillator, wherein the controller is configured to turn said local oscillator on and off between successively received UWB frames. This also facilitates determining the AoA more accurately, because it may ensure that receiver phase information is maintained in case an initiator and responder are operating at an integer carrier or channel frequency. Alternatively, or in addition, the controller may be configured to determine and compensate a carrier frequency offset (CFO). Thereby, the accuracy of the AoA determination may be further increased. In a practical implementation, the controller is configured to determine the CFO by receiving a separate UWB frame through the UWB communication unit.

In one or more embodiments, the communication device is configured to operate in a ranging mode. Alternatively, or in addition, the communication device may be configured to operate in a radar mode. Thus, sequential AoA operations may be enabled in a broader range of applications, covering both ranging-based applications as well as radar-based applications.

In one or more embodiments, a communication system comprises a communication device of the kind set forth, wherein the communication device is configured to operate as a responder node in the communication system. Thus, the communication device may be used to advantage in a system in which an initiator interacts with a responder. In one or more embodiments, the communication system further comprises an initiator node, wherein the initiator node comprises at least two antennas, a UWB communication unit configured to transmit UWB frames through said antennas, and a controller configured to switch between said antennas such that consecutive UWB frames are transmitted through different ones of said antennas. Thus, antenna switching may also be implemented on the transmitter-side, in order to calculate a phase difference of departure (PDoD) and an angle of departure (AoD) in a sequential manner, in a broader range of applications and implementations.

In one or more embodiments, a radar system comprises a communication device of the kind set forth, wherein the communication device is configured to operate as receiving node in the radar system and is collocated with a transmitting node in the radar system. Thus, the communication device may be used to advantage in a radar system containing a transmitting node and a receiving node configured to receive reflected signals. In one or more embodiments, the transmitting node comprises at least two antennas, a UWB communication unit configured to transmit UWB frames through said antennas, and a controller configured to switch between said antennas such that consecutive UWB frames are transmitted through different ones of said antennas. Thus, antenna switching may also be implemented on the transmitter-side, in order to calculate a phase difference of departure (PDoD) and an angle of departure (AoD) in a sequential manner, in a broader range of applications and implementations.

Figure 4:
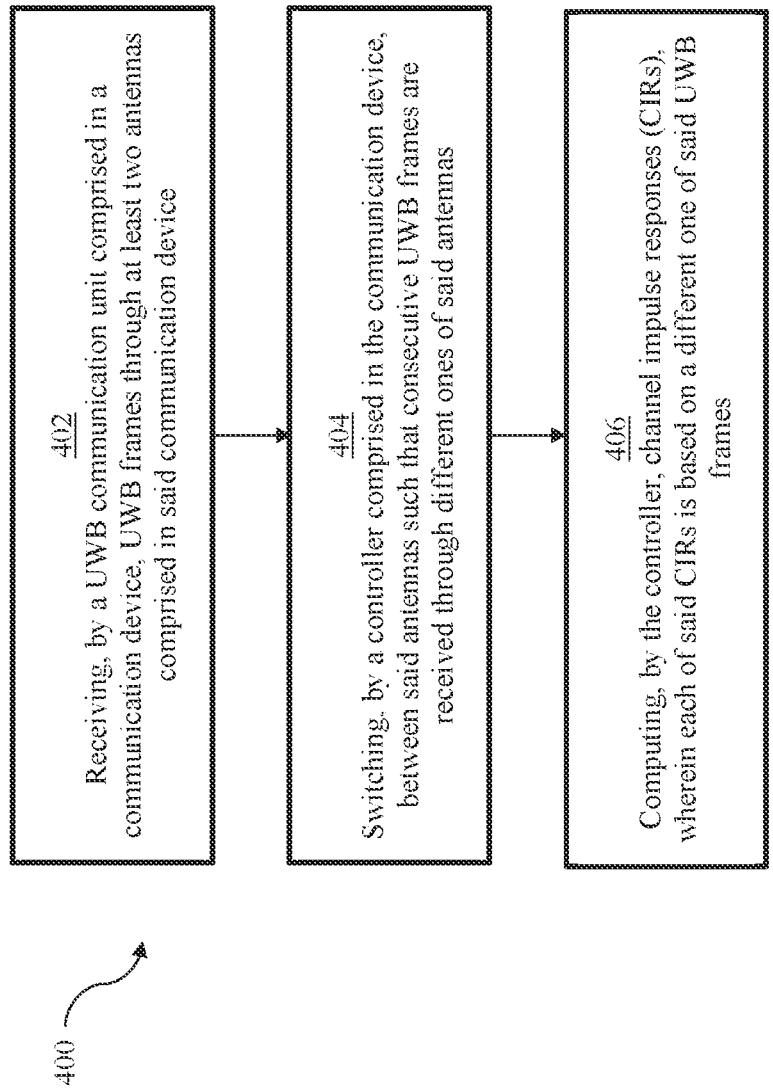
FIG. 4 shows an illustrative embodiment of a method of operating a communication device.

FIG. 4 shows an illustrative embodiment of a method 400 of operating a communication device. The method 400 comprises the following steps. At 402, a UWB communication unit comprised in a communication device receives UWB frames through at least two antennas comprised in said communication device. Furthermore, at 404, a controller comprised in the communication device switches between said antennas such that consecutive UWB frames are received through different ones of said antennas. Furthermore, at 406, the controller computes CIRs, wherein each of said CIRs is based on a different one of said UWB frames. As mentioned above, by switching between the antennas between consecutive UWB frames, sequential AoA operations may be enabled in a broader range of applications and implementations.

Figure 5:
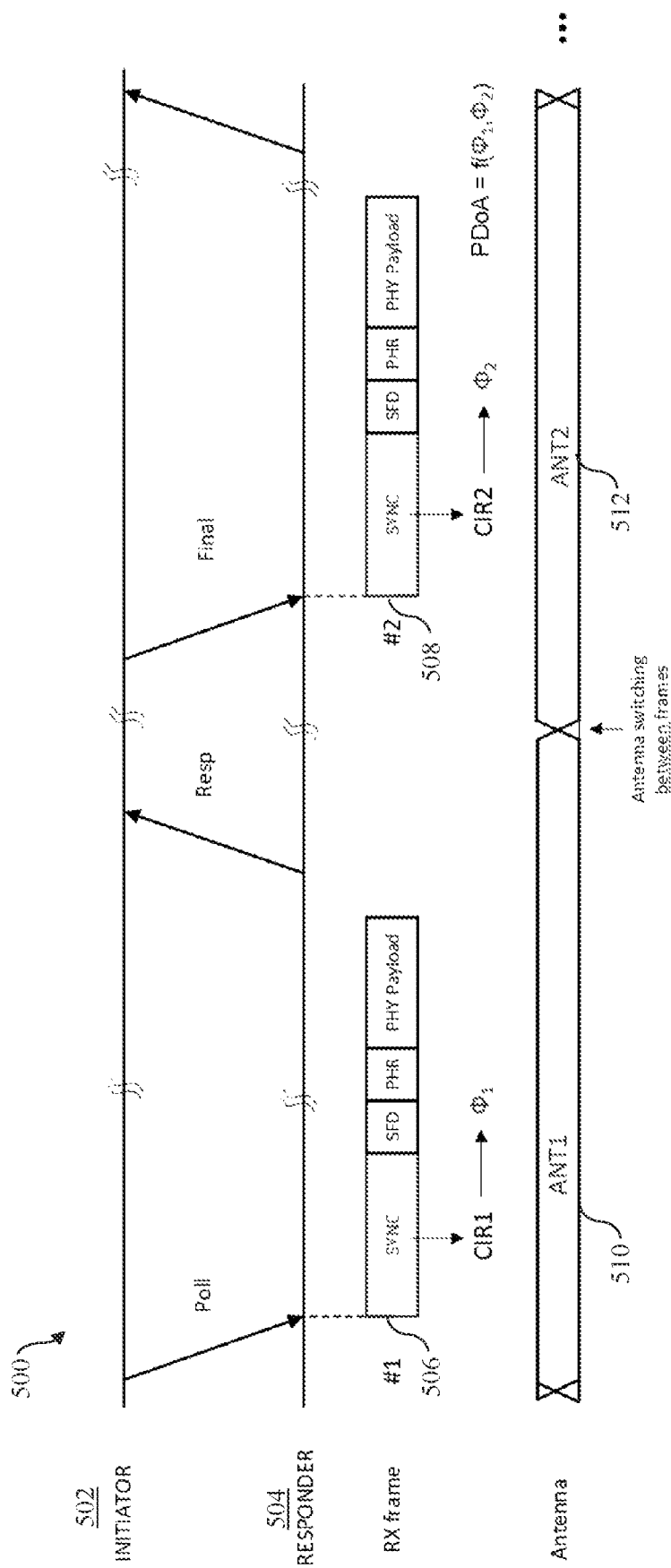
FIG. 5 shows an illustrative embodiment of a sequential angle-of-arrival estimation.

FIG. 5 shows an illustrative embodiment of a sequential angle-of-arrival estimation. In particular, a sequential angle-of-arrival estimation is shown for SP0 frames in a DS-TWR method. In accordance with the present disclosure, multiple frames may be transmitted and switching between different antennas may be performed between the frames. Furthermore, a CIR may be determined based on each of said frames. In practice, as shown in FIG. 5, the frames exchanged between an initiator 502 and a responder 504 during execution of the DS-TWR method may be used as follows.

1) The initiator 502 transmits a first UWB frame 506, i.e., a POLL frame (SP0), to the responder 504.

2) The responder 504 receives 510 the POLL frame through a first antenna. Then, the responder 504 may determine and store an optimal receiver phase, compute a CIR based on the POLL frame, and compute a phase value $\Phi 1$ associated with the CIR. Subsequently, the responder 504 may transmit a RESP frame to the initiator 502 and switch to a second antenna. It is noted that switching to the second antenna is not performed during the reception of the POLL frame, but after said POLL frame has been received and before the second UWB frame 508 is received.

3) The initiator 502 receives the RESP frame, and transmits the second UWB frame 508, i.e., a FINAL frame (SP0) to the responder 504.

4) The responder 504 receives 512 the FINAL frame through the second antenna. Then, the responder 504 may set an optimal receiver phase based, at least in part, on the previously stored receiver phase, compute a CIR based on the FINAL frame, and compute a phase value $\Phi 2$ associated with the CIR. Finally, the responder 504 may compute a PDoA from $\Phi 1$ and $\Phi 2$, and an AoA from the PDoA.

In practice the receiver may be turned off between the frames to save power, including the RF phase-locked loop generating the local oscillator (LO) signal for frame reception. To ensure that the phase difference between two successive frames is only due to the PDoA and not due to receiver imperfections (such as switching the LO on/off), it may be important to maintain a correct receiver phase information between the frames. This may be ensured in different ways. In one implementation, a phase tracking loop may determine and store an optimal receiver phase value (usually 0) for the first frame 506 and set an optimal receiver phase value for the second frame 508 based, at least in part, on the stored receiver phase value of the first frame 506. For example, the second receiver phase value may be such that the LO maintains its phase information despite being turned on/off. In another implementation, the initiator 502 and responder 504 may be operating at an integer carrier (or channel) frequency, which is a frequency that is an integer multiple of a reference clock frequency. At such an integer frequency, turning LO circuitry on/off between frames may ensure that receiver phase information is maintained. Finally, an additional carrier frequency offset (CFO) may be compensated before the actual AoA operation. In one implementation, a CFO may be determined by receiving a separate frame, e.g., prior to the first frame 506.

Figure 6:
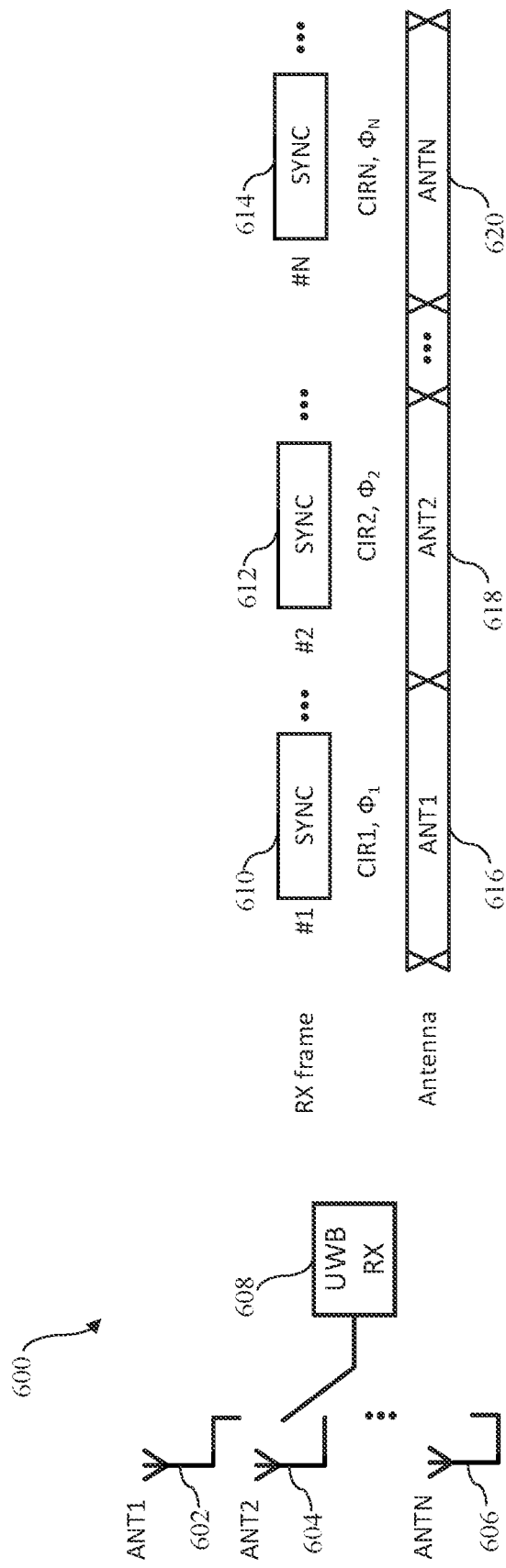
FIG. 6 shows an illustrative embodiment of an N-dimensional sequential angle-of-arrival estimation.

FIG. 6 shows an illustrative embodiment of an N-dimensional sequential angle-of-arrival estimation 600. In particular, a N-dimensional AoA may be determined without switching between antennas during reception of the frames. Instead, the antenna switching may be performed between frames. More specifically, a UWB receiver 608 may receive N successively transmitted frames from a transmitter (not shown), each frame including a synchronization symbol sequence (SYNC) and, optionally, other types of sequences or data. Each frame is received by a different antenna 602, 604, 606, and used to determine a CIR and compute a phase value $\Phi$. As shown, a first UWB frame 610 may be received 616 by ANT1 602, a second UWB frame 612 may be received 618 by ANT2 604, and an N-th frame 614 may be received 620 by ANTN 606. It is noted that other assignments of frame numbers to antennas may also be envisaged. Finally, the phase values $\Phi 1$ to $\Phi N$ may be processed to determine a PDoA and AoA. As a practical example for a 3D AoA, three SP0 frames may be received successively through three different antennas (N=3) as follows: SP0 frame #1 through ANT1, resulting in CIR1 and $\Phi 1$, SP0 frame #2 through ANT2, resulting in CIR2 and $\Phi 2$, and SP0 frame #3 through ANT3, resulting in CIR3 and $\Phi 3$. Furthermore, if the antenna pairs ANT1+2 and ANT2+3 are each separated by half the wavelength of the transmitted UWB carrier frequency and arranged in an L-shape, then the azimuth AoA may be computed from $\Phi 1$, $\Phi 2$ and the elevation AoA from $\Phi 2$, $\Phi 3$.

It is noted that antenna switching between frames may also be implemented on the transmitter-side, in order to determine a phase difference of departure and angle of departure. For this purpose, the following steps may be performed, which are analogous to the steps performed for computing the PDoA and AoA. In particular, the controller may switch between the transmit antennas such that consecutive UWB frames are transmitted through different antennas. More specifically, a first frame may be transmitted through a first antenna, the first frame may be received by the receiver, and a CIR and a first phase value associated with the CIR may be computed. Similarly, a second frame may be transmitted through a second antenna, the second frame may be received by the receiver, and a CIR and a second phase value associated with the CIR may be computed. Finally, the PDoD and AoD may be computed using the first and second phase value.

As mentioned above, the presently disclosed communication device and operating method may facilitate enabling AoA operations in, inter alia, applications and implementations in which UWB frames configured in the SP0 format are used. Since SP0 frames are shorter than SP1, SP2 and SP3 frames, this may have the advantages of (1) allowing a higher transmit power and larger distance and (2) reducing airtime and thus achieving a reduced interference. More specifically, the presently disclosed communication device and operating method may be used to advantage in applications such as industrial internet of things (IoT), in which secure ranging functionality may be less important (i.e., no STS is used). Accordingly, the presently disclosed communication device and operating method may provide a low-power AoA solution with reduced air interference.

Figure 7:
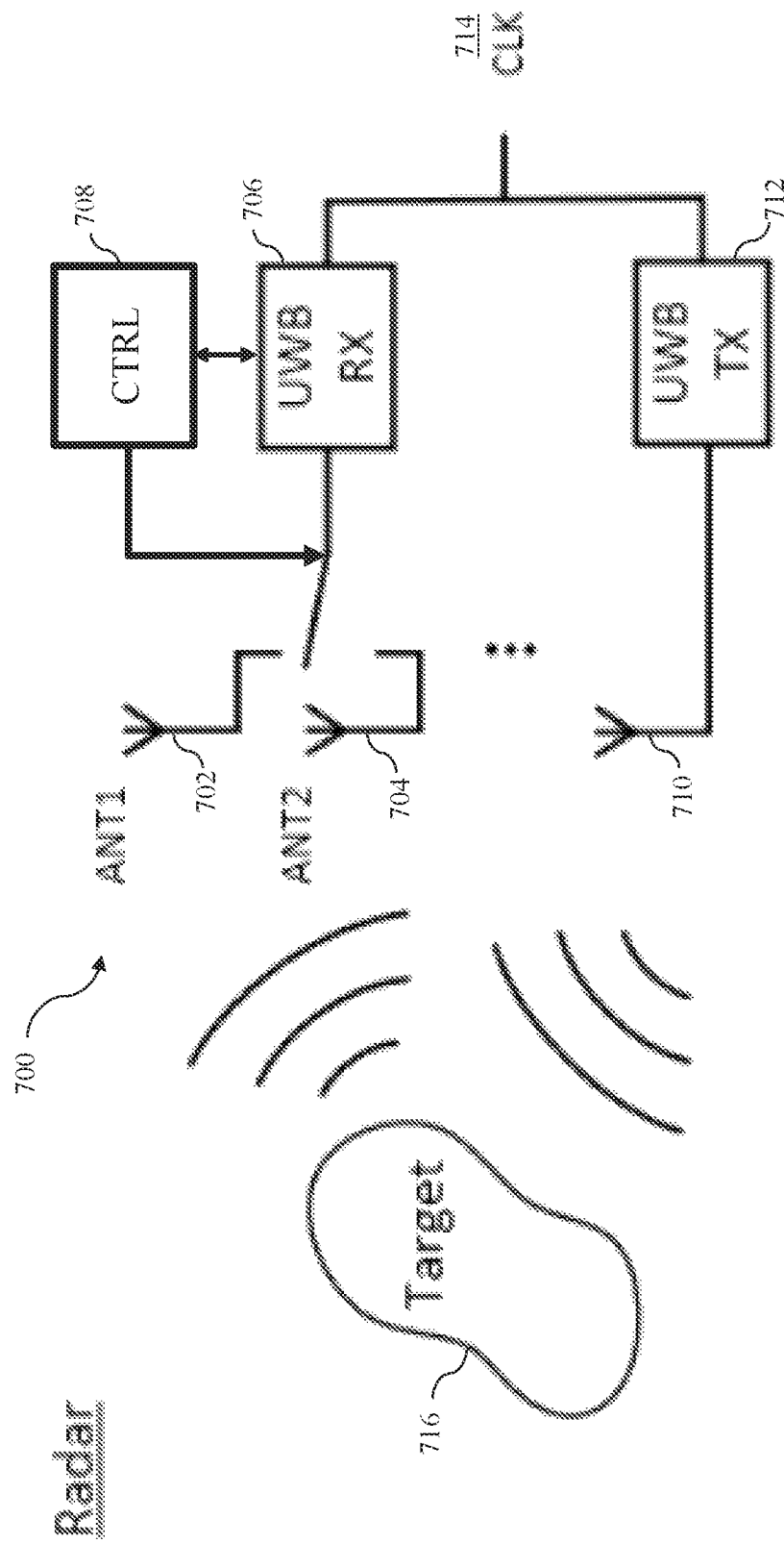
FIG. 7 shows an illustrative embodiment of a communication device operating in a radar mode.

FIG. 7 shows an illustrative embodiment of a communication device 700 operating in a radar mode. The device 700 comprises a UWB receiver 706, a first antenna 702 and a second antenna 704. The first antenna 702 and the second antenna 704 are operatively coupled to the UWB receiver 706 through a controllable switch. Furthermore, the device 700 comprises a controller 708 configured to switch between first antenna 702 and the second antenna 704 such that consecutive UWB frames are received through different ones of said antennas 702, 704. In addition, the device 700 comprises a UWB transmitter 712 and another antenna 710 operatively coupled to the UWB transmitter 712. Finally, the device 700 comprises a reference clock 714 which is shared between the UWB receiver 706 and the UWB transmitter 712. In operation, the device 700 is configured to detect an external target by operating in a UWB-based radar mode.

It is noted that the UWB receiver 706 and the UWB transmitter 712 are collocated. For example, the UWB receiver 706 and the UWB transmitter 712 may be integrated into the same chip, or they may be implemented in separate chips which are placed close together. Furthermore, as mentioned above, the UWB receiver 706 and the UWB transmitter 712 share the common reference clock 714. In this way, a carrier frequency offset may be avoided, which facilitates the implementation. The UWB transmitter 712 transmits radar frames which are reflected by the target 716, and the UWB receiver 706 receives the reflected radar frames. Similar to the operation in the ranging mode, the reflections see two different path lengths to the receiver antennas 702, 704. The difference in path lengths introduces a phase difference, such that the PDoA may be computed, and the PDoA facilitates determining the AoA. The controller 708 switches the antennas 702, 704 between the radar frames, in particular by controlling the controllable switch. It is noted that the AoA provides information about the angular direction to the target 716. Furthermore, it is noted that more than two antennas may be used, e.g., to determine the 3D AoA.

Figure 8:
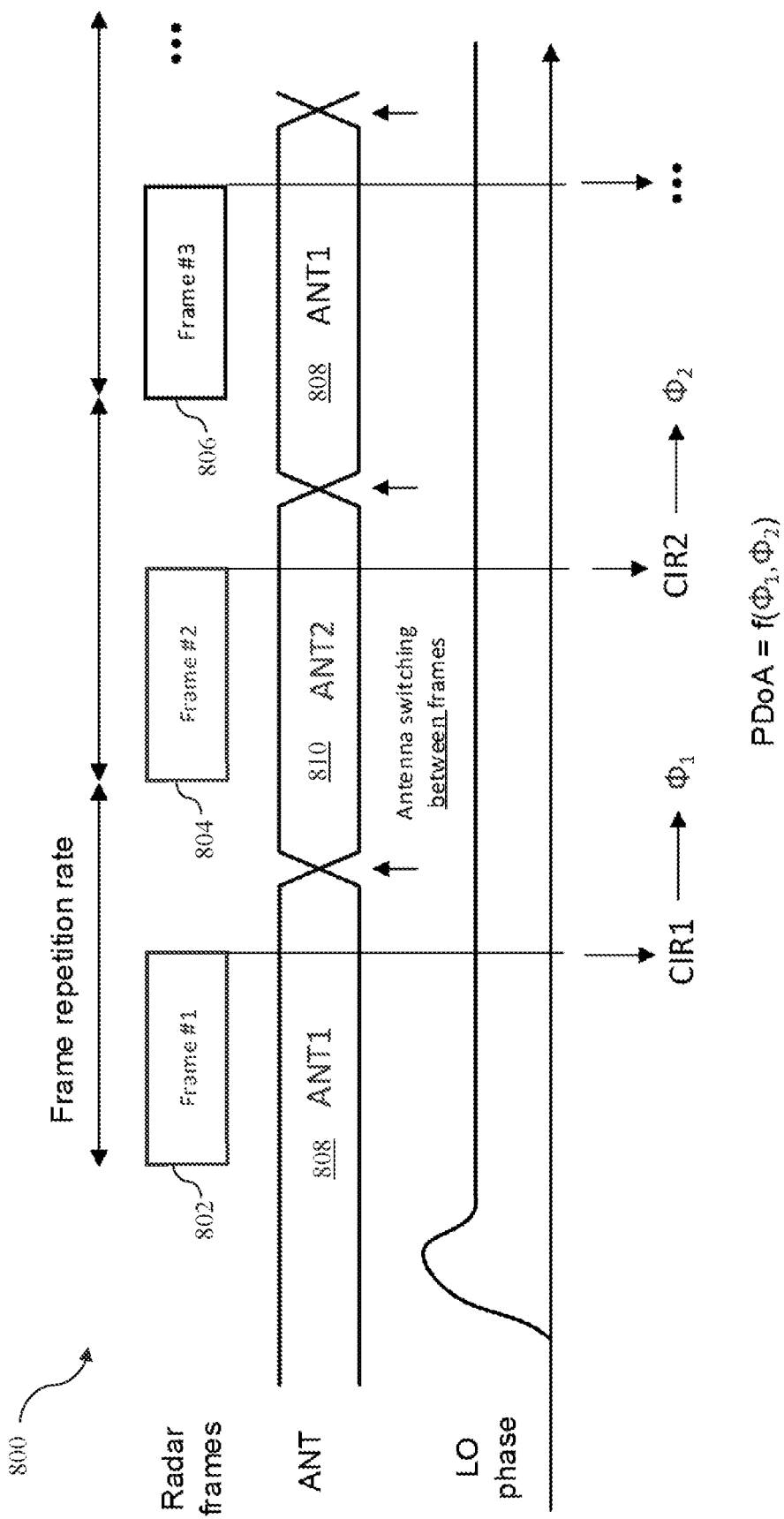
FIG. 8 shows an illustrative embodiment of a sequential angle-of-arrival estimation in a radar mode.

FIG. 8 shows an illustrative embodiment of a sequential angle-of-arrival estimation in a radar mode. In order to achieve an acceptable performance, one or more local oscillators may have to be settled to achieve a stable phase between a UWB transmitter and a UWB receiver and to avoid any phase ambiguity introduced by the local oscillators. This may for example be realized by using a shared reference clock and by operating radio frequency phase locked loops of the UWB transmitter and the UWB receiver on an integer channel. The AoA estimation in the radar mode may comprise the following steps.

1) The UWB transmitter transmits a first UWB radar frame 802.

2) The UWB receiver receives 808 the first UWB radar frame 802 through a first antenna ANT1. Then, a controller may compute a CIR and a phase value Φ1, and subsequently switch to a second antenna ANT2. It is noted that the switching is not performed during the reception of the first UWB radar frame 802, but after said frame has been received and before a second UWB radar frame 804 is received.

3) The UWB transmitter transmits the second UWB radar frame 804.

4) The UWB receiver receives the second UWB radar frame 804 through the second antenna ANT2. Then, the controller may compute a CIR and a phase value Φ2.

5) Subsequently, the controller may compute a PDoA from Φ1 and Φ2, and an AoA from the PDoA.

6) Steps 1 to 5 may be repeated this for frames 3, 4 . . . 5, 6 . . . (i.e., the antennas ANT1 and ANT2 may be alternated between the frames). More specifically, the odd numbered frames 1, 3, 5 . . . may be received through the first antenna ANT1, and the even-numbered frames 2, 4, 6 . . . may be received through the second antenna ANT2.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 STS packet configurations
102 STS packet configuration zero
104 STS packet configuration one
106 STS packet configuration two
108 STS packet configuration three
200 communication system
202 UWB transmitter
204 antenna
206 UWB receiver
208 first antenna
210 second antenna
300 communication device
302 first antenna
304 second antenna
306 UWB receiver
308 controller
400 method of operating a communication device
402 receiving, by a UWB communication unit comprised in a communication device, UWB frames through at least two antennas comprised in said communication device
404 switching, by a controller comprised in the communication device, between said antennas such that consecutive UWB frames are received through different ones of said antennas
406 computing, by the controller, channel impulse responses (CIRs), wherein each of said CIRs is based on a different one of said UWB frames
500 sequential angle-of-arrival estimation
502 initiator
504 responder
506 first UWB frame
508 second UWB frame
510 reception through a first antenna
512 reception through a second antenna
600 N-dimensional sequential angle-of-arrival estimation
602 first antenna
604 second antenna
606 N-th antenna
608 UWB receiver
610 first UWB frame
612 second UWB frame
614 N-th UWB frame
616 reception through the first antenna
618 reception through the second antenna
620 reception through the N-th antenna
700 communication device operating in a radar mode
702 first antenna
704 second antenna
706 UWB receiver
708 controller
710 antenna
712 UWB transmitter
714 clock
716 target
800 sequential angle-of-arrival estimation in a radar mode
802 first UWB frame
804 second UWB frame
806 third UWB frame
808 reception through the first antenna
810 reception through the second antenna

The invention claimed is:

1. A communication device, comprising:
at least two antennas;
an ultra-wideband, UWB, communication unit configured to receive UWB frames through said antennas;
a controller configured to switch between said antennas such that consecutive UWB frames are received through different ones of said antennas;
wherein the controller is further configured to compute channel impulse responses, CIRs, wherein each of said CIRs is based on a different one of said UWB frames.

2. The communication device of claim 1, wherein the controller is further configured to compute the CIRs based on a SYNC field comprised in said UWB frames.

3. The communication device of claim 2, wherein the controller is further configured to compute phase values, wherein each of said phase values is associated with a different one of the CIRs.

4. The communication device of claim 2, wherein the controller is further configured to determine and store an optimal receiver phase value for a first UWB frame, and to set an optimal receiver phase value for a second UWB frame based, at least in part, on the stored optimal receiver phase value for the first UWB frame.

5. The communication device of claim 2, further comprising a local oscillator, wherein the controller is configured to turn said local oscillator on and off between successively received UWB frames.

6. The communication device of claim 2, wherein the controller is further configured to determine a carrier frequency offset, CFO, in particular by receiving a separate UWB frame through the UWB communication unit, and to compensate said CFO.

7. The communication device of claim 2, being configured to operate in a ranging mode.

8. The communication device of claim 1, wherein the controller is further configured to compute phase values, wherein each of said phase values is associated with a different one of the CIRs.

9. The communication device of claim 8, wherein the controller is further configured to compute an angle of arrival based on at least one of the phase values.

10. The communication device of claim 1, wherein the controller is further configured to determine and store an optimal receiver phase value for a first UWB frame, and to set an optimal receiver phase value for a second UWB frame based, at least in part, on the stored optimal receiver phase value for the first UWB frame.

11. The communication device of claim 1, further comprising a local oscillator, wherein the controller is configured to turn said local oscillator on and off between successively received UWB frames.

12. The communication device of claim 1, wherein the controller is further configured to determine a carrier frequency offset, CFO, in particular by receiving a separate UWB frame through the UWB communication unit, and to compensate said CFO.

13. The communication device of claim 1, being configured to operate in a ranging mode.

14. A communication system comprising the communication device of claim 13, wherein the communication device is configured to operate as a responder node in the communication system.

15. The communication system of claim 14, further comprising an initiator node, wherein the initiator node comprises:
   at least two antennas;
   a UWB communication unit configured to transmit UWB frames through said antennas;
   a controller configured to switch between said antennas such that consecutive UWB frames are transmitted through different ones of said antennas.

16. The communication device of claim 1, being configured to operate in a radar mode.

17. A radar system comprising the communication device of claim 16, wherein the communication device is configured to operate as receiving node in the radar system and is co-located with a transmitting node in the radar system.

18. The radar system of claim 17, wherein the transmitting node comprises:
   at least two antennas;
   a UWB communication unit configured to transmit UWB frames through said antennas;
   a controller configured to switch between said antennas such that consecutive UWB frames are transmitted through different ones of said antennas.

19. A method of operating a communication device, the communication device comprising at least two antennas, an ultra-wideband, UWB, communication unit and a controller, the method comprising:
   the UWB communication unit receives UWB frames through said antennas;
   the controller switches between said antennas such that consecutive UWB frames are received through different ones of said antennas;
   the controller computes channel impulse responses, CIRs, wherein each of said CIRs is based on a different one of said UWB frames.

* * * * *